United States Patent
Houze et al.

(10) Patent No.: US 8,088,209 B2
(45) Date of Patent: Jan. 3, 2012

(54) CATIONIC LIQUID STARCHY COMPOSITION AND USES THEREOF

(75) Inventors: Régis Houze, Tourmignies (FR); Marika Ladret, Lompret (FR)

(73) Assignee: Roquette Freres, Lestrem (FR)

( * ) Notice: Subject to any disclaimer, the term of this patent is extended or adjusted under 35 U.S.C. 154(b) by 998 days.

(21) Appl. No.: 10/562,819

(22) PCT Filed: Jul. 1, 2004

(86) PCT No.: PCT/FR2004/001708
§ 371 (c)(1), (2), (4) Date: Dec. 30, 2005

(87) PCT Pub. No.: WO2005/014709
PCT Pub. Date: Feb. 17, 2005

(65) Prior Publication Data
US 2006/0180289 A1  Aug. 17, 2006

(30) Foreign Application Priority Data
Jul. 8, 2003  (FR) ..................... 03 08327

(51) Int. Cl.
*C08L 3/00* (2006.01)
*C08B 30/12* (2006.01)
*C08B 30/00* (2006.01)
*C08B 37/00* (2006.01)

(52) U.S. Cl. ......... 106/206.1; 162/175; 127/29; 127/32; 127/33; 127/36; 127/65; 127/71

(58) Field of Classification Search ............ 127/29, 127/32, 33, 36, 65, 67, 71
See application file for complete search history.

(56) References Cited

U.S. PATENT DOCUMENTS
2004/0112559 A1 *  6/2004  Du Bourg et al. ............ 162/175

FOREIGN PATENT DOCUMENTS
| BE | 626 712 | 7/1963 |
| FR | 2 434 821 | 3/1980 |
| WO | WO 95/18157 | 7/1995 |
| WO | WO 01/96403 | 12/2001 |

OTHER PUBLICATIONS
Suzuki Osamu et al: "Cationic starch of low molecular weight and low viscosity" WPI World Patent Information Derwent, Derwent, GB, vol. 1974, No. 25 PA—Hohnen Oil KK PN—JP48069885 A, 1974, XP002161931 abstract.
Database WPI Section Ch, Week 199914 Derwent Publications Ltd., London, GB; Class All, AN 1999-156595 XP002273178 & JP 11 012979 A (Seiko Kagaku Kogyo KK) Jan. 19, 1999 abstract & Patent Abstracts of Japan vol. 1999, No. 04 Apr. 30, 1999 & JP 11 012979 A (Seiko Kagaku Kogyo Co Ltd), Jan. 19, 1999 abstract.

* cited by examiner

*Primary Examiner* — Shuangyi Abu Ali
(74) *Attorney, Agent, or Firm* — Young & Thompson

(57) ABSTRACT

A novel cationic liquid starchy composition and uses thereof in industry, in particular, as an additive in paper and cardboard production, as an additive for treatment of industrial water, either from paper or cardboard production or not, or for the preparation of such additives. The cationic liquid starchy composition is characterized by selected dry material, viscosity, total nitrogen content and pH values. The viscosity is 200 mPa·s with a maximum of 1000 mPa·s, (according to a T test). The nitrogen content is at least 0.6% with a maximum of 1.4% (dry/dry). The cationic liquid starchy composition can contain, at least one polyol, preferably a saccharide and used as is or after dilution. The composition is particularly suitable, for the preparation of adhesive agents, particularly of the ASA type for bringing into contact, directly or not, with a fiber composition having a raised calcium ion content.

3 Claims, No Drawings

CATIONIC LIQUID STARCHY COMPOSITION AND USES THEREOF

The present invention relates to a novel cationic liquid starchy composition exhibiting selective characteristics of dry matter, of viscosity, of total nitrogen level and of pH.

It also relates to the use of said cationic liquid starchy composition in industrial fields, in particular paper manufacture, board manufacture and treatment of process water.

Finally, it is targeted very particularly at its use in the field of sizing agent compositions used for the internal or external treatment of paper and board.

In industrial sectors, in particular in the fields of paper manufacture, board manufacture and treatment of process waters resulting or not resulting from paper manufacture or board manufacture, recourse is commonly made to cationic starchy compositions as additives as is or as means intended for the preparation of additives.

Such a use is disclosed, for example, in patent WO 01/96403 on behalf of the Applicant Company.

Other fields of application of such compositions relate to chemistry in general, glues and adhesives in general, the textile industry, hydraulic binders, combustible or noncombustible briquettes, the treatment of metals, detergent compositions, photography, drilling, plant protection products, cosmetological products, and the like.

Whatever the uses for which the cationic starchy compositions are intended, they are generally supplied in the form of powders by starch producers to manufacturers for the manufacture of finished or semi-finished products.

At the desired moment, i.e. immediately before their applicational use, said manufacturers subject said powders to an appropriate treatment.

This treatment, thus carried out on site and immediately before use, conventionally consists of the preparation of a suspension or "slurry" of cationic starchy material exhibiting a dry matter ("DM") at most equal to 10%, of the dissolution, generally continuously, of said cationic starchy material on a cooking device and of the dilution, also continuously, of the hot glue thus obtained.

The dilute glue thus prepared on the actual site of its applicational use conventionally exhibits a DM of between 0.5 and 9%, generally between 1 and 7%.

However, in some cases, manufacturers wish to be able to dispose directly of liquid starchy compositions which can be used as such or at any rate after a simple operation of diluting in water.

This form of presentation makes it possible to eliminate the need to dissolve the cationic starchy material on site and thus to employ, on site, equipment (continuous cooker or jet cooker in particular) and personnel necessary for this dissolution.

It can also make possible more accurate metering and/or easier mixing of the cationic starchy material at the time of its applicational use, for example as additive intended to reduce troublesome substances present in water circuits or as additive intended for the preparation of compositions based on sizing agents.

In any case, this liquid presentation form allows the manufacturer to have available a composition which is unvarying in its characteristics, in particular of concentration and of temperature.

However, in order to be satisfactory economically, such cationic liquid starchy compositions have to be sold with a DM which is sufficiently high in order to avoid having to transport and store large volumes of water.

A DM of at least 10% is then required, making it possible in addition to meet all the wishes of the users and in particular not to require, on site, any expensive operation for reconcentrating the commercial cationic liquid starchy compositions.

In addition, making available cationic liquid starchy compositions which can be used as such or by simple dilution in water requires that these compositions exhibit:

good stability on storage, both on the manufacturer's site and on the user's site, a viscosity suitable for the transportation, pumping and diluting operations, physicochemical characteristics (including viscosity characteristics) suitable for as many potential uses as possible.

In view of these constraints, there exists, to the knowledge of the Applicant Company, only a very small number of cationic liquid starchy compositions which have experienced true commercial growth.

A technology recommended by Raisio Chemicals Ltd ("Raisio") and disclosed in particular in its patents WO 93/10305, WO 95/18157, WO 98/24972 and WO 99/18288 consists overall of the preparation and application of highly cationic potato starch glues obtained from reaction media possessing high dry matters (DM>50%), approximately half of which is contributed by the cationization reagent alone. This preparation involves a preliminary stage of oxidation of the starchy material by hydrogen peroxide.

The nitrogen level of the compositions preferentially recommended for use is overall greater than 2% and generally lies between 2.5 and 5%.

However, there are a number of disadvantages to such glues.

First, and as is confirmed by the analyses carried out by the Applicant Company on products sold under the "Raifix" name, these highly cationic glues exhibit a relatively low level of fixing of the nitrogen, generally of less than 65%. This results in particular in a high residual amount of cationic reagent and/or of its hydrolysis products actually within such compositions, which is harmful to their true effectiveness as agents for removing troublesome substances present in paper manufacturing circuits or as additives in the preparation of sizing agent compositions.

Furthermore, this very partial fixing of the nitrogenous cationic reagent makes it difficult to envisage the use of these glues as additives for the treatment of process water, in particular water intended for human or animal consumption.

In addition, the high pH of these glues, generally of greater than 9, can present problems of safety and of corrosion inherent in the preparation, handling and use of alkaline products.

Furthermore, the high pH of these glues is harmful to their use in the preparation of compositions based on sizing agents, such as, for example, alkenylsuccinic anhydrides ("ASA"), by promoting the hydrolysis and thus the loss in effectiveness of said sizing agents. This hydrolysis phenomenon can furthermore cause foaming or fouling problems in industrial devices (emulsifier, papermaking machine, and the like) and pipes downstream or upstream of these devices.

Finally, due to their relatively high viscosity, these highly cationic glues are generally poorly suited to operations for diluting in and then for introducing into an aqueous medium, in particular when these operations are carried out at ambient temperature or at a relatively low temperature (<50° C.).

There are also available on the market cationic starchy compositions sold by Raisio under the name "Raibond 15" which are less highly cationic than the abovementioned "Raifix" compositions.

However, they exhibit a nitrogen level which is still high, namely generally of at least 1.6% approximately. Their pH also remains high, namely greater than 9.

To the knowledge of the Applicant Company, other cationic liquid starchy compositions are or have been provided to manufacturers which, in contrast, exhibit a relatively low nitrogen level, namely of less than 0.5%.

This is in particular the case with the "Redisize 132" composition sold by National Starch and Chemical Company ("National"), corresponding to an 8% solution of cationic waxy corn starch, which can be used for the preparation of sizing agent compositions as disclosed in U.S. Pat. No. 6,296,696.

It should be remembered that, in the field of cationic starchy materials actually available commercially (generally in the form of powders) for the purpose of their use in the preparation of sizing agent compositions, in particular of "ASA" or "AKD" (alkylketene dimer) type, recourse is conventionally made to cationic starches exhibiting relatively low nitrogen levels (<0.5%).

These weakly cationic products generally result from bases rich in amylopectin (waxy starches). This is because the use of such starchy bases, for example disclosed in patents EP 353 212 and more recently U.S. Pat. No. 6,001,166, makes it possible to confer a satisfactory stability in solution on the resulting weakly cationic products. In addition, the "branched" structures of these products would improve the stability and the effectiveness of the sizing agents (EP 353 212) and it is for this reason that the proposal has recently been made, in patent WO 00/49226, to make available cationic products of all bases (including waxy bases), the "branched" structure of which is enhanced by chemical crosslinking.

However, such products are extremely viscous and their use can only really be envisaged in media having a very high temperature. However, a high temperature increases the risks of hydrolysis of sizing agents.

The use in a very general way, and in particular in the preparation of sizing agent compositions, of cationic solid or liquid starchy compositions exhibiting a limited nitrogen level (at most equal to 2%) and a very low viscosity, namely of less than 1600 mPa·s, for a DM adjusted to 20%, has been recommended by the Applicant Company in its above mentioned patent WO 01/96403.

This viscosity, thus measured at a DM of 20%, lies very preferably between 50 and 700 mPa·s.

As has been confirmed by the Applicant Company, in particular for the starchy compositions used in the examples of said patient, this viscosity, if it had been measured for a DM adjusted to 10% (instead of 20%), would have been (much) less than 200 mPa·s.

This is in particular the case with "composition 2", envisaged in the preparation of an ASA emulsion according to example 6 of said patent, which already, at a DM adjusted to 20%, exhibits a viscosity (100 mPa·s) of much less than 200 mPa·s.

The cationic liquid starchy compositions disclosed in this patent generally make it possible to meet the technical/economic requirements, mentioned above, of current industrial practice.

The Applicant Company has now found that it is possible to make available to manufacturers cationic liquid compositions which are further improved and which are selected according to the four criteria of dry matter (DM), of viscosity, of total nitrogen level and of pH, said compositions being in particular advantageously suited to the preparation of sizing agent compositions.

A subject matter of the present invention is thus a novel cationic liquid starchy composition, characterized in that it exhibits:
    a dry matter (DM) at least equal to 10%, preferably of between 10 and 50%,
    a viscosity, determined according to a T test, of greater than 200 mPa·s and at most equal to 1000 mPa·s,
    a total nitrogen level at least equal to 0.6% and at most equal to 1.4%, these percentages being expressed by dry weight with respect to the dry weight of the composition,
    a pH of less than 9, preferably of between 3.5 and 8.5.

The T test used to measure the viscosity of the liquid composition according to the invention consists, firstly, in determining, by any conventional method within the scope of a person skilled in the art, the dry matter of said composition, this being at least equal to 10% in accordance with the invention.

If this dry matter is greater than 10%, it is adjusted to 10% by simple dilution in distilled water. If this dry matter is 10%, no dilution is carried out. Subsequently, the Brookfield viscosity of the composition in question is measured in a way known per se at 25° C. and at 20 revolutions/minute, the composition thus exhibiting a DM of 10% (after or without dilution).

According to an advantageous alternative form, the viscosity of the cationic liquid starchy composition according to the invention, measured according to the T test, is at least equal to 250 mPa·s and at most equal to 950 mPa·s, preferably at least equal to 275 mPa·s and at most equal to 930 mPa·s.

This viscosity can in particular be between 300 and 900 mPa·s.

The dry matter of the cationic liquid starchy composition in accordance with the invention can, in particular as indicated, reach a value of 50%. However, preferably, this dry matter is between 10 and 35%.

This dry matter can be composed (virtually) exclusively of a cationic starchy material as described below, including salts, of the cationic reagent and/or of its hydrolysis products, and/or other compounds resulting from the cationization and which are possibly still present in said cationic starchy material.

However, this dry material can, in addition to said cationic starchy material, comprise compounds not resulting from the cationization stage and which were employed before and/or after said stage.

These compounds can in particular be chosen from the group consisting of preservatives, for example biocides and bactericides, rheology agents, for example polyols and salts of hydroxycarboxylic acids, such as lactates or gluconates, pigments and fillers, aluminum salts, scale inhibitors, and the like.

The Applicant Company has found in particular that it can be advantageous to combine, within a cationic liquid starchy composition in accordance with the invention, at least one cationic material and at least one polyol, said polyol making it possible, inter alia, to adjust the viscosity of said composition and in particular to lower the viscosity of said composition for the purposes, if necessary, of adapting it to a specific use or, if necessary, of allowing it to achieve a value in accordance with the present invention.

Said polyol can consist of a product of nonsaccharide nature, such as glycerol, polyethylene glycol, and the like.

Very advantageously, said polyol is of saccharide nature and is chosen in particular from the group consisting of hydrogenated inonosaccharides, hydrogenated disaccharides, hydrogenated trisaccharides, hydrogenated oligo- and polysaccharides and any mixture of at least any two of these products.

It can in particular be sorbitol, isosorbide, mannitol, xylitol, erythritol, maltitol, lactitol or a hydrogenated starch hydrolysate.

According to another advantageous alternative form, the total nitrogen level of the liquid composition according to the invention is at least equal to 0.7% and at most equal to 1.3% (dry/dry).

Furthermore, the pH of said composition preferably lies at a value significantly lower than 9, in particular between 3.5 and 7.5 and more particularly between 4 and 7.

The liquid composition according to the invention, saleable, storable and optionally usable "as such", generally exhibits a temperature of less than 60° C., preferably at most equal to 50° C. and in particular of between 10 and 40° C.

These temperatures are unequivocally distinguished from the temperatures of the sizes produced, conventionally from powders and with very low DM values, on site at the premises of the manufacturer (paper manufacturer, for example), which temperatures are conventionally much higher.

The starchy material present in the liquid composition according to the invention is not limited to waxy starches, such as commonly recommended or made use of industrially in the prior art. It can result from all starches of natural or hybrid origin, including those originating from genetic mutations or manipulations. Said starches can result in particular from potato, waxy potato, corn, waxy corn, wheat, waxy wheat, high-amylose corn, rice, peas, high-amylose peas, barley or tapioca, fractions which can be prepared or obtained, such as amylose, amylopectin, particle size fractions known to those skilled in the art under the terms of wheat starch "A" and wheat starch "B", and any mixture of at least any two of the abovementioned products, for example a mixture of at least one tuber starch (in particular potato starch) and of at least one cereal starch (wheat "A", wheat "B", corn or waxy corn starch in particular) or of two cereal starches.

The cationic starchy materials present in the compositions according to the invention can furthermore consist of amphoteric products, i.e. of products which are both cationic and anionic. The anionic substituents can, by way of examples, be chosen from the group consisting of the phosphate, phosphonate, sulfate, sulfoalkyl, carboxyl, carboxyalkyl and sulfocarboxyl groups.

They can advantageously be phosphated, succinylated, sulfosuccinylated, hydroxyalkylated and acetylated groups.

The viscosity of the compositions according to the invention can also be obtained by multiple means, in particular chemical, enzymatic and/or physical means, applied in a continuous or batchwise manner, in one or more stages, before, during and/or after the cationization stage. These means include those disclosed in any one of the abovementioned patents, provided that they make it possible to achieve, directly or indirectly, the viscosity specifically selected according to the invention, namely greater than 200 mPa·s and at most equal to 1000 mPa·s according to the T test.

There are consequently available novel industrial products which exhibit:
not only a) good stability on storage and b) a viscosity suitable for the transportation, pumping and dilution operations,
but also improved operating possibilities in comparison with the liquid cationic compositions of the prior art.

This use can be envisaged in all the fields of application mentioned in the introduction (chemistry, glues and adhesives, the textile industry, paper manufacture, board manufacture, water treatment, and the like). As the case may be, the cationic liquid starchy composition according to the invention can be used "as such" or can be diluted beforehand, so that its dry matter is lowered to a value of between 0.5 and 9%, preferably between 1 and 7%.

However, the cationic starchy composition according to the invention can in the first place be used, as such or after dilution, as additive chosen from the group consisting of additives for paper manufacture and board manufacture and additives for the treatment of process water, resulting or not resulting from paper manufacture or board manufacture, or is intended for the preparation of such an additive.

Particular advantageously, the cationic liquid starchy composition according to the invention can be used as additive chosen from the group consisting of wet-end additives, additives intended to reduce troublesome substances present in water circuits and/or retained on equipment for processes related or not related to paper manufacture, additives intended for the preparation of sizing agent compositions used for the internal or external treatment of paper or board, additives intended for the preparation of compositions for the creping, surface treatment or coating of paper or board, or additives intended for the preparation of compositions comprising optical brightening agents, fillers, pigments, aluminum salts, colloidal silica, dyes and/or synthetic polymers.

The Applicant Company has found in particular that the composition according to the invention is particularly well suited to the preparation of sizing agent compositions including sizing agents disclosed in any one of the abovementioned patents.

The sizing agent can comprise a product chosen from the group consisting of alkenylsuccinic acids and derivatives, in particular their salts and anhydrides, alkylketene dimers and derivatives, rosin and derivatives, alkyl aldehyde acetals, alkyl isocyanates, synthetic (co)polymers and any mixture of at least any two of said products.

It can in particular be a sizing agent comprising an alkenylsuccinic anhydride ("ASA"), as will be exemplified hereafter.

It has been found that the physicochemical characteristics of the starchy, composition selected according to the invention, in particular the characteristics of pH, of viscosity and of total nitrogen level, make it possible to achieve excellent results in terms of protection and thus of effectiveness of the sizing agents, in particular of ASA type.

It has in particular been observed that these results are improved in comparison with those obtained with less viscous products, such as those disclosed in the abovementioned patent WO 01/06403, or products exhibiting higher values for pH and for total nitrogen.

In addition, the Applicant Company has discovered that the cationic liquid starchy composition in accordance with the invention, optionally diluted, is particularly effective when it is brought into contact or is intended to be brought into contact (directly or indirectly, for example via a sizing agent composition) with a fibrous composition (for example a papermaking pulp) exhibiting a high content of calcium ions, namely a content at least equal to 200 mg/l, in particular of between 250 mg/l and 1000 mg/l. This content can in particular be between 400 and 800 mg/l.

It has also been found, as will be described elsewhere, that the composition according to the invention is highly suitable in particular as additive for the purpose of the manufacture:
of tissue paper,
of surface-treated or coated paper or board, and/or,
of corrugating paper, for example of fluting paper intended for the preparation of corrugated board.

The composition according to the invention can also be very advantageously used as additive intended to reduce troublesome substances present in paper manufacturing water circuits.

Furthermore, it has been observed that the composition according to the invention can be used for the treatment, in particular the gumming, sizing, finishing or starching, of various textile materials (fibers, yarns, laps, fabrics) due to its high affinity for such materials, for example those based on cotton or on polyester/cotton.

It confers thereon in particular good resistance to abrasion.

The present invention will be described in even more detail using the examples which follow, which are in no way limiting.

EXAMPLE 1

A potato starch powder exhibiting a total nitrogen level of 1.2% (dry/dry) and obtained in the dry phase in accordance with patent FR 2 434 821 on behalf of the Applicant Company is mixed with and suspended in cold demineralized water so as to obtain a cationic starch slurry with a dry matter ("DM") of 11.5%.

Various samples of said slurry are treated, in an open vessel, with variable levels of α-amylase and/or different operating conditions (conversion temperature, duration, in particular), the objective being to be able to obtain a cationic starchy composition exhibiting a Brookfield viscosity (measured at 25° C. and at 20 revolutions/minute) of approximately 250 to 300 mPa·s and a DM of 10% or very slightly greater.

A cationic liquid starchy composition (hereinafter "composition A") exhibiting a dry matter (DM) of 10.2%, a Brookfield viscosity (25° C., 20 revolutions/minute) of 330 mPa·s (i.e., of 290 mPa·s according to the T test after adjustment of the DM to 1.0%), a total nitrogen level of 1.2% and a pH of 5.3 was thus obtained.

Composition A exhibits very good stability on storage, no phenomenon of increase in viscosity or of retrogradation being observed after storage at 25° C. for 1 month.

EXAMPLE 2

A potato starch powder exhibiting a total nitrogen level of 0.8% (dry/dry) and obtained in the dry phase in accordance with patent FR 2 434 821 on behalf of the Applicant Company is mixed with and suspended in cold demineralized water so as to obtain a cationic starch slurry with a dry matter ("DM") of 22%.

Various samples of said slurry are treated, in an open vessel, with variable levels of α-amylase and/or different operating conditions (conversion temperature, duration, in particular), the objective being to be able to obtain a cationic starchy composition exhibiting a Brookfield viscosity (measured at 25° C. and at 20 revolutions/minute) of approximately 2500 to 3000 mPa·s and a DM of approximately 20%.

A cationic liquid starchy composition (hereinafter "composition B") exhibiting a dry matter (DM) of 19.7%, a Brookfield viscosity (25° C., 20 revolutions/minute) of 2580 mPa·s (i.e., of 350 mPa·s according to the T test after adjustment of the DM to 10%), a total nitrogen level of 0.8% and a pH of 5.1 was thus obtained.

Composition B exhibits very good-stability on storage, no phenomenon of increase in viscosity or of retrogradation being observed after storage at 25° C. for 1 month.

Furthermore, the stable cationic liquid starchy compositions below were obtained:

Composition C: cationic potato starch glue comprising 10.6% of DM, exhibiting a total nitrogen level of 1.2%, a viscosity of 580 mPa·s according to the T test and a pH of 4.9, Composition 1): cationic potato starch glue comprising 10.2% of DM, exhibiting a total nitrogen level of 0.8%, a viscosity of 910 mPa·s according to the T test and a Ph of 5.0

Composition E: cationic waxy corn starch glue comprising 27% of DM, exhibiting a total nitrogen level of 0.65%, a viscosity of 330 mPa·s according to the T test and a pH of 5.2.

EXAMPLE 3

The performances of compositions A and B in accordance with the invention described above are evaluated in the context of the preparation of a sizing agent composition, this being carried out in comparison with respectively:

a control cationic liquid starchy composition (hereinafter "composition T1") identical to the composition used in example 6 of patent WO 01/96403 and thus exhibiting a low viscosity (100 mPa·s at an adjusted DM of 20%), a total nitrogen level of 1.5% (dry/dry) and a pH of 5.8;

a commercial control cationic liquid starchy composition (hereinafter "composition, T2") exhibiting a dry matter of approximately 19%, a total nitrogen level of 1.75% (dry/dry), a Brookfield viscosity (25° C., 20 rev/min) of 650 mPa·s (i.e., of 120 mPa·s after adjustment of its DM to 10% according to the T test) and a pH of 11.

Compositions A, B, T1 and T2 exhibit a temperature of approximately 25° C. Each is first of all diluted with pump water, the temperature of which is approximately 25° C., so that the DM of each of these compositions is lowered to 4%.

3.33 g of the sizing agent "Fibran 76" based on ASA are added to 100 g of each of these compositions thus diluted to a DM of 4% and having a temperature thus of approximately to 25° C.

The sizing compositions thus obtained from, respectively, the diluted compositions A, B, T1 and T2 and from "Fibran 76" (hereinafter respectively denoted "additive A", "additive B", "additive T1" and "additive T2") thus exhibit a starchy material (on a dry basis)/sizing agent ratio by weight of approximately 1.2/1.

Each of additives A, B, T1 and T2 is subsequently subjected, at ambient temperature, to a high shearing treatment, namely homogenization for 5 minutes at 20 000 revolutions/minute.

The mean particle size of the sizing agent emulsions thus obtained from each of additives A, B, T1 and T2 is subsequently evaluated, immediately after said treatment ("T0") and 24 hours after said treatment ("T24").

The mean particle size is measured on a "Beckman Coulter LS Particle Size Analyzer" device, the volume of the particles being taken into account. It is expressed in μm.

The "mean" particle size values below are obtained at T0 and T24:

|  | T0 | T24 |
|---|---|---|
| Additive A | 1.8 | 8.2 |
| Additive B | 1.5 | 7.5 |
| Additive T1 | 1.7 | 11.4 |
| Additive T2 | 9.2 | 58.2 |

It is observed that, under the conditions of the present test, which have not been optimized, additives A and B, obtained from compositions A and B according to the invention, exhibit:
- a stability which is further improved in comparison with additive T1 obtained from composition T1,
- a fineness and a stability which are very significantly greater than those of additive T2 obtained from composition T2.

The Applicant Company believes that the greater viscosity of compositions A and B in accordance with the invention in comparison with that of compositions T1 and T2 might explain, in all or part, their greater protective power for the sizing agent.

The very high pH of composition T2 might furthermore explain its poor performance, said pH promoting the hydrolysis of the sizing agent. This hydrolysis is moreover revealed by the appearance of a brownish foam in the emulsion prepared from additive T2.

Furthermore, the high value of the mean particle size of said emulsion, in combination with the observation that said emulsion exhibits several populations of particles, suggests that Composition T2 was intrinsically of low stability.

The Applicant Company has furthermore observed that, at the industrial scale, it is in fact advantageous, both from a technical and from an economic viewpoint, to use the cationic liquid starchy compositions according to the invention, in particular in comparison with cationic starchy compositions exhibiting a lower total nitrogen level.

In addition, it has been found that these advantages are particularly underline when the compositions according to the invention are intended to be brought into contact, as such or after dilution, either directly (for example, as wet-end additives) or indirectly (for example, as additives for the preparation of a sizing agent composition), with fibrous compositions (in particular paper pulps) exhibiting high contents of calcium ions.

These advantages can in particular result in
- an improvement in certain physical characteristics of paper of any nature and for any purpose (printing/writing paper, corrugating paper, tissue paper, and the like), and/or
- an improvement in the characteristics and performances of sizing agent compositions of any nature (ASA, AKD or others) and for any purpose (internal and/or external sizing of paper or board).

In particular, it has been found that cationic liquid starchy compositions such as compositions A to E described above make it possible, in comparison with cationic starchy compositions with lower total nitrogen levels and dissolved, on site on a continuous cooking device, to very significantly reduce the amount of sizing agent employed, this being the case without reducing the effectiveness thereof and while retaining the general physical characteristics of the paper, indeed even while improving some of them.

Furthermore, it has been found that the compositions in accordance with the invention, such as compositions B and E described above, make it possible, in the context of the manufacture of tissue paper:
- not only to improve in a very general way the physical characteristics, in the wet state and in the dry state, of said paper but also
- to significantly improve the thickness of said paper, and
- to improve, during calendering operations, the strength of said paper or "Tinting" phenomenon.

This is achieved without reducing, indeed even while improving, the functioning of the machine and the overall productive output of the system.

The cationic compositions in accordance with the invention can also advantageously be used in the manufacture of surface-treated or coated paper or board and in, particular:
- in combination with certain pigments, in particular of anionic nature, employed in "inkjet printing" applications,
- more generally, as additives for surface-treating or coating compositions, for the purpose of improving the printability of the paper,
- as substitute for cationic polymers of non-starch origin (polydadmac, polyaluminum chloride, and the like) employed in coating compositions or in surface-treating compositions, in particular applied on devices of size press or film press type.

Furthermore, the Applicant Company has found that a composition in accordance with the invention, such as the abovedescribed composition A, can advantageously be used in the manufacture of a corrugating paper, in particular of a waste paper based fluting exhibiting a grammage of approximately 140 g/m$^2$.

Composition A, employed in place of a cationic polyacrylamide in a specific retention system, makes it possible to significantly improve not only said retention but also the physical characteristics (in particular the CMT index and the Mullen index) of the resulting fluting paper.

The same composition A has furthermore proven to be particularly useful as additive intended to reduce troublesome substances present in paper manufacturing water circuits. Composition A, used in a proportion of 0.1% (dry/dry with respect to the weight of fibrous material) makes it possible in particular to improve the effectiveness of a cationic starch conventionally used as wet-end additive, the effectiveness of which has been reduced due to the existence of numerous undesirable anionic substances in the fibrous composition predominantly composed of a pulp of "chemical/thermal/mechanical" type.

Said composition A has made it possible, while significantly reducing, i.e. by approximately 14%, the level of introduction of the conventional wet-end additive, to significantly increase, i.e. by at least 5 to 10%, both the total retention (thus including that of the conventional wet-end additive) and the retention of the fillers alone or the retention of the fibers alone.

What is claimed is:

1. A method of preparing a sizing composition for paper manufacture comprising:
   (a) providing a cationic liquid starchy composition having:
      a dry matter of between 10 and 50%,
      a viscosity, determined according to a T test, of at least equal to 275 mPa·s and at most equal to 930 mPa·s,
      a total nitrogen level at least equal to 0.6% and at most equal to 1.4%, these percentages being expressed by dry weight with respect to the dry weight of the composition, and
      a pH of between 3.5 and less than 9;
   (b) diluting the cationic liquid starchy composition to a dry matter value of between 0.5 and 9%; and
   (c) mixing the diluted cationic liquid starchy composition with a sizing agent comprising alkenylsuccinic anhydride to obtain a resulting composition.

2. The method of claim 1, wherein the cationic liquid starchy composition is diluted in step (b) to a dry matter value of between 1 and 7%.

3. The method of claim 1, further comprising (d) submitting the resulting composition to a shearing treatment at a rate of at least 20 000 revolutions/minute for at least 5 minutes.

* * * * *